April 15, 1952 W. W. THOMPSON ET AL 2,593,220
FISH BAIT
Filed June 24, 1946
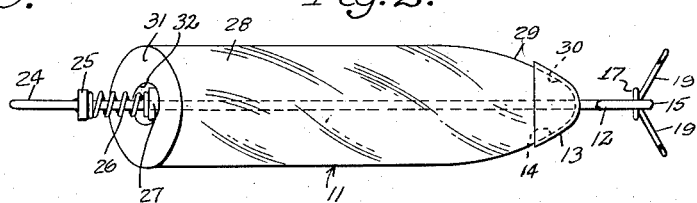
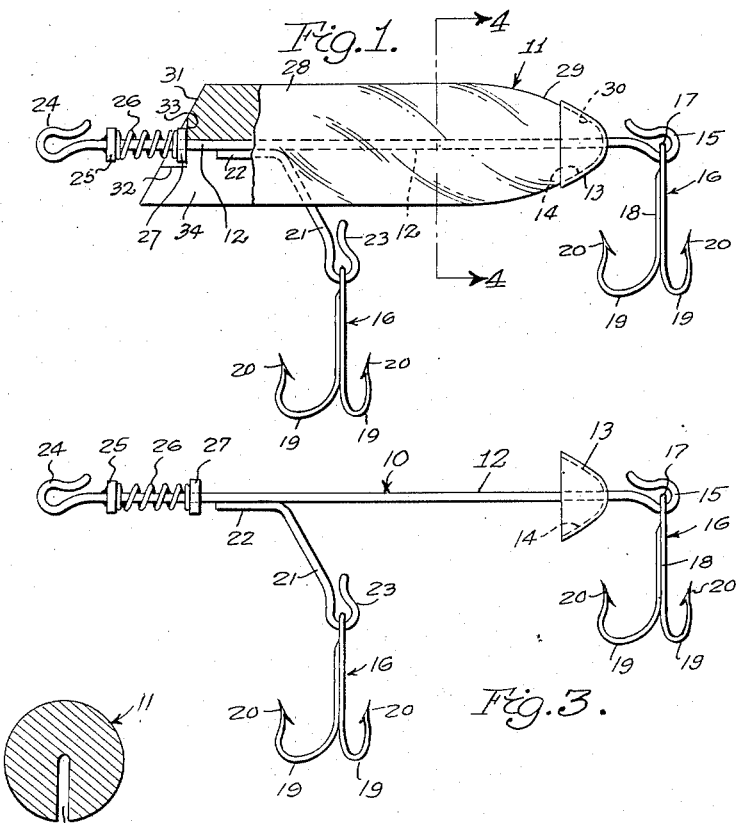
INVENTOR.
William W. Thompson
Gilbert F. Whitston
BY
Barthel & Bugbee
ATTY'S Patented Apr. 15, 1952

2,593,220

UNITED STATES PATENT OFFICE 2,593,220

FISH BAIT

William W. Thompson, Birmingham, and Gilbert F. Whitston, Inkster, Mich.

Application June 24, 1946, Serial No. 678,852

1 Claim. (Cl. 43—42.09)

This invention relates to artificial fish baits, and in particular to such fish baits with interchangeable bodies.

One object of this invention is to provide a fish bait having a construction such that one body may be removed and another substituted instantly in its place, without the necessity for special tools and without any removable parts which may become lost.

Another object is to provide a fish bait wherein the frame of the fish bait, together with its hooks, is completely detachable from the body by a simple manual operation, so that the bodies themselves have no projections which can catch in the clothing or pockets of the user.

Another object is to provide a fish bait, as set forth in the preceding object, wherein the various bodies are smooth in shape so that a number of them can be carried in the pockets of the user and instantly interchanged with the body which is then in position upon the frame carrying the hooks.

Another object is to provide a fish bait, as set forth in the preceding objects wherein the body is a simple elongated member having a slot which receives the frame, substantially all of the movable parts for holding the body in position being a part of the frame.

Other objects and advantages of the invention will become apparent during the course of the following description of the accompanying drawings, wherein:

Figure 1 is a side elevation, partly in central vertical section, of a fish bait according to a preferred form of the invention;

Figure 2 is a top plan view of the fish bait shown in Figure 1;

Figure 3 is a side elevation of the frame of the fish bait shown in Figures 1 and 2, with the body removed; and Figure 4 is a cross-section through the body taken along the line 4—4 in Figure 1, with the frame omitted; and Figure 5 is a fragmentary longitudinal vertical section through the rearward portion of a modified form of the invention.

Referring to the drawings in detail, Figure 3 shows a frame, generally designated 10, for a fish bait, according to a preferred form of the invention, adapted to receive any one of a number of fish bait bodies, generally designated 11 (Figure 1). The frame 10 consists of an elongated rod-like member 12 having a bell-shaped member 13 mounted on the member 12 near the rearward end thereof and provided with a recess 14 therein. The rearward end of the member 12, as shown, terminates in a hooked portion 15 but may also employ any other type of conventional fastening, such as an eyelet or any other suitable means of attachment for a fish hook unit 16. The latter is provided with the usual eyelet 17 at the top of its shank 18 and has the usual bent portions 19 terminating in barbs 20. The fish hook unit 16 is shown as consisting of a triple hook, but a single hook of conventional pattern may be employed, if desired.

The frame 10 is also provided with a downwardly extending arm 21 having an upper portion 22 secured to the member 12 intermediate its ends and having a similar attachment portion 23 resembling the attachment portion 15, a hook-like portion being shown for purposes of illustration. A similar fish hook unit 16 is also mounted thereon in a manner similar to the fish hook unit 16 previously described as mounted on the attachment portion 15. A single hook may also be mounted upon the portion 23 at the option of the user.

The forward end of the member 12 is curved as at 24 into the form of a hook or eyelet for the attachment of a conventional swivel, leader or fishing line, these forming no part of the invention. Behind the portion 24 there is fixedly secured to the member 12 a washer or collar 25 serving as an abutment for the forward end of a coil spring 26, the rearward end of which engages a slidable washer 27 which is movable along the rod-like member 12.

The body 11 may be of a variety of shapes and colors, the body shown being of elongated roughly cylindrical shape having a side wall 28 tapering toward its rearward end as at 29, the extreme end portion 30 being of a shape corresponding to the shape of the cavity 14 so as to mate therewith. The forward end 31 of the body 11 is shown as inclined and plane, but may be concave or otherwise shaped according to the desire of the user and the action desired from the fish bait. The forward end 31, however, is provided with a recess 32 having an abutment wall 33 at the bottom thereof, preferably perpendicular to the rod-like member 12 so as to receive the rearward face of the slidable washer 27 when the spring 26 is in a compressed condition. The body 11 is also provided with a longitudinal slot 34 (Figure 4), preferably slightly greater in width than the diameter of the rod-like member 12 and extending along the entire length of the body 11 and upwardly from the bottom edge thereof to approximately the center line.

In the use of the fish bait, let it be assumed that a body 11 is in the position shown in Figures 1 and 2, and it is desired to change bodies. The user grasps the rearward portion 15 of the frame 10 in one hand and with his other hand grasps the body 11 and pushes it in a forward direction, compressing the coil spring 26 until the rearward end 30 of the body 11 moves completely out of the cavity 14. The rearward end 30 of the body 11 is then swung upward, pivoting around the abutment wall 33 until it is clear of the bell-shaped member 13, whereupon the body 11 is pulled upwardly and rearwardly to disengage it from the washer 27 and at the same time move the slot 34 completely out of engagement with the rod-like member 12.

The user then selects the desired body from his set of bodies and inserts it by reversing the previously described motion. In so doing, he inserts the forward end of the slot 34 upon the rod-like member 12 with the abutment wall 33 of the recess 32 in engagement with the slidable washer 27, and pushes the body 11 forward, at the same time holding the rearward portion 15 in his other hand. When the body 11 has been moved forward by compressing the spring 26 a sufficient amount so that the rearward end 30 of the body 11 clears the bell-shaped member 13, he pushes downward upon the body 11 until the rod-like member 12 reaches the limit of the slot 34, whereupon the body 11 is released. The urge of the spring 26 then causes the washer 27 to push the body 11 rearwardly so that the end 30 enters the cavity 14 and mates therewith. The fish bait is then again ready for use with the selected body.

The modification shown in Figure 5 is generally similar to the principal form of the invention shown in Figures 1 to 4 inclusive except for the body, hence similar parts are similarly designated. The body 11 is provided with the same longitudinal slot 34 as in Figure 1, but at the extreme end portion 30 thereof it is provided with a socket 35 adapted to nest with the forward or inner surface 36 of an abutment member 37 mounted on the rod-like member 12, and secured thereto in any suitable way. The rearward or outer surface 38 is preferably rounded off to form a smooth continuation of the body end 30.

The use of the modification of Figure 5 is similar to that of Figure 1 and a similar procedure in changing bodies is followed. Instead of the rearward end 30 nesting in the cavity 14 of the bell-shaped member 13, however, the socket 35 nests with the forward surface 36 of the abutment member 37 and these surfaces are urged into firm engagement by the coil spring 26.

While we have shown and described our invention in detail, it is to be understood that the same is to be limited only by the appended claim, for many changes may be made without departing from the spirit and scope of our invention.

What we claim is:

A fish bait of the type having removable and interchangeable bodies, comprising an elongated body having a substantially straight slot extending longitudinally from end to end thereof and transversely substantially halfway through said body from one side thereof, a substantially rigid elongated straight rod removably insertable in said slot, said rod having its opposite ends projecting from the opposite ends of said body and terminating in eye-shaped loops for the attachment of a fishing line and a hook respectively, forward and rearward body holding elements mounted on said rod near the forward and rearward ends respectively of said rod and detachably engageable with the opposite ends of said body, the forward element being movably mounted on said rod, a spring attached to said rod and yieldingly urging said movable forward element into locking engagement with the forward end of said body, said rearward holding element and the rearward end of said body having interfitting portions of corresponding configuration engageable with one another, a fish hook attached to one of said loops, an arm secured to said rod and extending downwardly therefrom through said slot with its outer end projecting therefrom, and a second fish hook attached to the lower end of said arm.

WILLIAM W. THOMPSON.
GILBERT F. WHITSTON.

REFERENCES CITED

The following references are of record in the file of this patent:

UNITED STATES PATENTS

| Number | Name | Date |
| --- | --- | --- |
| 423,128 | Christoffel | Mar. 11, 1890 |
| 810,017 | Ackerman | Jan. 16, 1906 |
| 881,805 | Klein | Mar. 10, 1908 |
| 1,600,652 | Steenstrup | Sept. 21, 1926 |
| 1,786,520 | Darling | Dec. 30, 1930 |
| 1,842,591 | Dunkelberger | Jan. 26, 1932 |
| 2,127,639 | Breuer | Aug. 23, 1938 |
| 2,190,449 | Goldammer | Feb. 13, 1940 |
| 2,223,823 | Hampton | Dec. 3, 1940 |
| 2,231,270 | Huston | Feb. 11, 1941 |
| 2,295,292 | Rogers | Sept. 8, 1942 |